(12) United States Patent
Ishida et al.

(10) Patent No.: US 7,782,743 B2
(45) Date of Patent: *Aug. 24, 2010

(54) HIGH DENSITY PHASE-CHANGE TYPE OPTICAL DISK HAVING A DATA EFFICIENCY OF MORE THAN 80 PERCENT

(75) Inventors: Takashi Ishida, Yawata (JP); Hiromichi Ishibashi, Ibaraki (JP); Mamoru Shoji, Sakai (JP); Atsushi Nakamura, Kadoma (JP); Junichi Minamino, Nara (JP); Shigeru Furumiya, Himeji (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/864,226

(22) Filed: Sep. 28, 2007

(65) Prior Publication Data
US 2008/0025194 A1 Jan. 31, 2008

Related U.S. Application Data

(60) Continuation of application No. 10/892,658, filed on Jul. 16, 2004, now Pat. No. 7,697,406, and a division of application No. 10/169,336, filed as application No. PCT/JP01/08775 on Oct. 4, 2001, now Pat. No. 6,804,190.

(30) Foreign Application Priority Data
Oct. 10, 2000 (JP) ............................. 2000-308755

(51) Int. Cl.
G11B 7/24 (2006.01)

(52) U.S. Cl. ................................. 369/275.4; 369/275.2
(58) Field of Classification Search .............. 369/275.3, 369/275.2, 275.4
See application file for complete search history.

(56) References Cited

U.S. PATENT DOCUMENTS

| 5,477,527 A | 12/1995 | Tsuchiya et al. |
| 5,680,376 A | 10/1997 | Katayama et al. |

(Continued)

FOREIGN PATENT DOCUMENTS

| EP | 0 631 277 A2 | 12/1994 |

(Continued)

OTHER PUBLICATIONS

Narahara, T., et al., "Optical Disc System for Digital Video Recording", Jpn. J. Appl. Phys., vol. 39, pp. 912-919 (2000).

(Continued)

*Primary Examiner*—Tan X Dinh
(74) *Attorney, Agent, or Firm*—Panitch Schwarze Belisario & Nadel LLP (57) ABSTRACT

An optical disk includes a groove and a land. Data is recorded on either the land or the groove. A pitch of the groove and a pitch of the land are 0.32 μm or more. The optical disk has a data efficiency of 80% or more by adopting a format in which other types of user data are added to every plural user data sets. The data efficiency is defined by a ratio of a user data capacity that can be used by a user to a total data capacity of the optical disk.

13 Claims, 9 Drawing Sheets

U.S. PATENT DOCUMENTS

| | | | |
|---|---|---|---|
| 5,751,512 | A | 5/1998 | Anderson |
| 5,838,657 | A | 11/1998 | Tsuchiya et al. |
| 5,867,474 | A | 2/1999 | Nagasawa et al. |
| 5,999,504 | A | 12/1999 | Aoki |
| 6,016,302 | A | 1/2000 | Yamatsu et al. |
| 6,069,870 | A | 5/2000 | Maeda et al. |
| 6,078,560 | A | 6/2000 | Kashiwagi |
| 6,097,695 | A | 8/2000 | Kobayashi |
| 6,287,660 | B1 | 9/2001 | Hosaka et al. |
| 6,301,208 | B1 | 10/2001 | Sugaya et al. |
| 6,345,034 | B1 | 2/2002 | Kim |
| 6,373,815 | B1 | 4/2002 | Ishida et al. |
| 6,385,257 | B1 | 5/2002 | Tobita et al. |
| 6,449,241 | B1 | 9/2002 | Seong et al. |
| 6,511,788 | B1 | 1/2003 | Yasuda et al. |
| 6,564,009 | B2 | 5/2003 | Owa et al. |
| 2003/0086307 | A1* | 5/2003 | Lee et al. ............ 369/275.4 |
| 2004/0027943 | A1 | 2/2004 | Furumiya et al. |

FOREIGN PATENT DOCUMENTS

| | | |
|---|---|---|
| JP | 02-044577 A | 2/1990 |
| JP | 10-069646 A | 3/1998 |
| JP | 10-154378 A | 6/1998 |
| JP | 11-031337 A | 2/1999 |
| JP | 11-149644 A | 6/1999 |
| JP | 11-259868 A | 9/1999 |
| WO | 01/52250 A1 | 7/2001 |
| WO | 01/54119 A2 | 7/2001 |
| WO | 02/33699 A1 | 2/2002 |

OTHER PUBLICATIONS

Ichimura, Isao, et al.; "Optical Disk Recording Using a GaN Blue-Violet laser Diode"; Japanese Journal of Applied Physics, vol. 39, No. 2B, Feb. 2000; pp. 937-942; Tokyo, Japan.

Kasami, Yutaka, et al.; "Large Capacity and High-Data-Rate Phase-Change Disks"; Japanese Journal of Applied Physics, vol. 39, No. 2B, Feb. 2000; pp. 756-761; Tokyo, Japan.

Tieke, Benno, et al.; "High Data-Rate Phase Change Media for the Digital Video Recording System"; Japanese Journal of Applied Physics, vol. 39, No. 2B, Feb. 2000; pp. 762-765; Tokyo, Japan.

Supplementary European Search Report for the corresponding European Patent Application No. 01 97 2700.7 dated Feb. 4, 2008; 4 pages.

* cited by examiner

FIG.1(a)

GROOVE 2
OPTICAL DISK 1

FIG.1(b)

GROOVE 2
LAND 6
RECORDING MARK
LIGHT TRANSMITTING LAYER 5
INFORMATION RECORDING LAYER 4
DISK SUBSTRATE 3

HIGH DENSITY PHASE-CHANGE TYPE OPTICAL DISK HAVING A DATA EFFICIENCY OF MORE THAN 80 PERCENT

CROSS-REFERENCE TO RELATED APPLICATIONS

This application is a continuation of U.S. patent application Ser. No. 10/892,658 filed Jul. 16, 2004, which is divisional of U.S. patent application Ser. No. 10/169,336, filed Jun. 25, 2002. The disclosure these applications are incorporated herein by reference.

BACKGROUND OF THE INVENTION

The present invention relates to a disk storage medium on which data is recorded by light (which will be referred to as an "optical disk").

In recent years, optical disks such as DVD-RAM and DVD-RW have been used as storage media for recording digital information thereon at a high density. Each of these optical disks used commonly today is designed in such a manner as to record data of 4.7 GB per side by being irradiated with a laser beam having a wavelength of 650 nm through an optical system (e.g., objective lens) having a numerical aperture of 0.6. Thus, approximately one hour of video signal can be recorded on each side.

However, the maximum recordable length of approximately one hour is not long enough to cope with most of actual applications. Accordingly, to make those optical disks as handy as home video tape recorders, those optical disks should acquire an even greater storage capacity. Also, to perform editing and other types of operations by making full use of the random-access capability, which is one of advantageous features of the optical disks, video signal needs to be recorded for about five hours or more. In that case, the data storage capacity of the optical disks should be at least 23 GB and preferably more.

However, it is not easy to produce an optical disk with such a huge capacity because the recording density must be tremendously increased from the currently available one.

The present invention overcomes the problems described above, and a primary object thereof is to provide an optical disk that achieves a high recording density and a huge storage capacity.

BRIEF SUMMARY OF THE INVENTION

An optical disk according to the present invention includes a land and a groove. On the optical disk, data is recorded on both the land and the groove. The optical disk has a data efficiency of 80% or more. A distance between the center of the land and the center of the groove adjacent to the land is 0.28 μm or more.

In one preferred embodiment, the data is recorded by using a modulation code of a 3T system.

In another preferred embodiment, the data is recorded by using a modulation code of a 2T system.

In another preferred embodiment, a product code is used as an error correction code.

In another preferred embodiment, the groove is wobbled.

In another preferred embodiment, the optical disk further includes a light transmitting layer on the surface of the disk on which the groove and the land have been formed. The light transmitting layer has a thickness of 0.2 mm or less.

Another optical disk according to the present invention includes a land and a groove. On the optical disk, data is recorded on either the land or the groove. A pitch of the groove and a pitch of the land are 0.32 μm or more. And the optical disk has a data efficiency of 80% or more.

In one preferred embodiment, the data is recorded by using a modulation code of a 3T system.

In another preferred embodiment, the data is recorded by using a modulation code of a 2T system.

In another preferred embodiment, a product code is used as an error correction code.

In another preferred embodiment, the groove is wobbled.

In another preferred embodiment, the groove includes a plurality of wobble patterns.

In another preferred embodiment, the wobble patterns represent address information.

In another preferred embodiment, the optical disk further includes a light transmitting layer on the surface of the disk on which the groove and the land have been formed. The light transmitting layer has a thickness of 0.2 mm or less.

In another preferred embodiment, the optical disk has a storage capacity of 23 GB or more.

In another preferred embodiment, the optical disk further includes a recording layer of a phase change material and the data is rewritable.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIGS. 9(a) and 9(b) are graphs showing how the jitter and the bit error rate of a PRML read signal change with the tilt angle when a modulation code of a 2T system is used:

FIGS. 10(a) and 10(b) illustrate four types of wobble patterns of track grooves:

DETAILED DESCRIPTION OF THE INVENTION

Hereinafter, preferred embodiments of the present invention will be described with reference to the accompanying drawings.

Embodiment 1

Figure 1A:
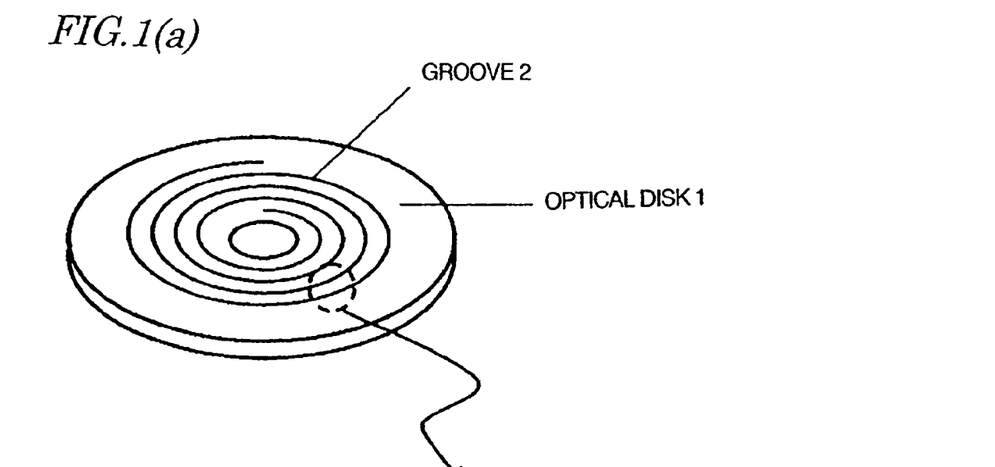
FIGS. 1(a) and 1(b) are respectively a perspective view and a partial view illustrating an optical disk according to a first embodiment.
Figure 1B:
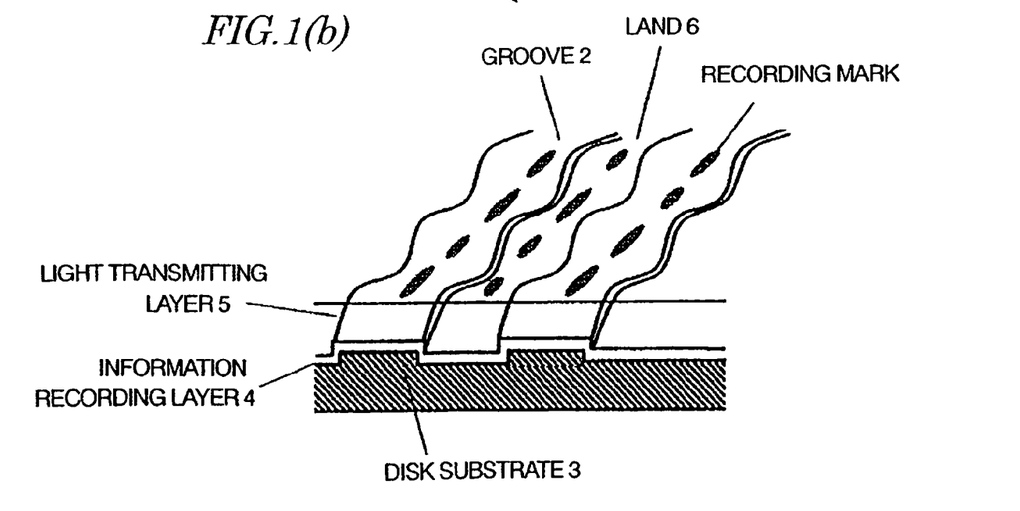

FIGS. 1(a) and 1(b) are respectively a perspective view and a partial view of an optical disk 1 according to a first embodiment of the present invention.

As shown in FIG. 1(a), spiral grooves 2 have been formed on the optical disk 1. This optical disk 1 has a diameter of 120 mm and has been formed to have a total thickness of 1.2 mm. Also, as shown in FIG. 1(b), the optical disk 1 is made by forming an information recording layer 4 of a phase change material such as a GeSbTe film, for example, on a disk substrate 3. A light transmitting layer 5, which transmits a laser beam and guides it onto the information recording layer 4, is further formed on this information recording layer 4 so as to have a thickness of about 0.1 mm. A zone between two grooves 2 is called a land 6. In this optical disk 1, data is recorded on both the grooves 2 and the lands 6.

As can be seen from FIG. 1(b), the grooves 2 are wobbled. It should be noted that the optical depth of the grooves 2 is set approximately equal to $\lambda/6$, where $\lambda$ is the laser wavelength. This is done to reduce the crosstalk occurring between the land 6 and the grooves 2.

Figure 2:
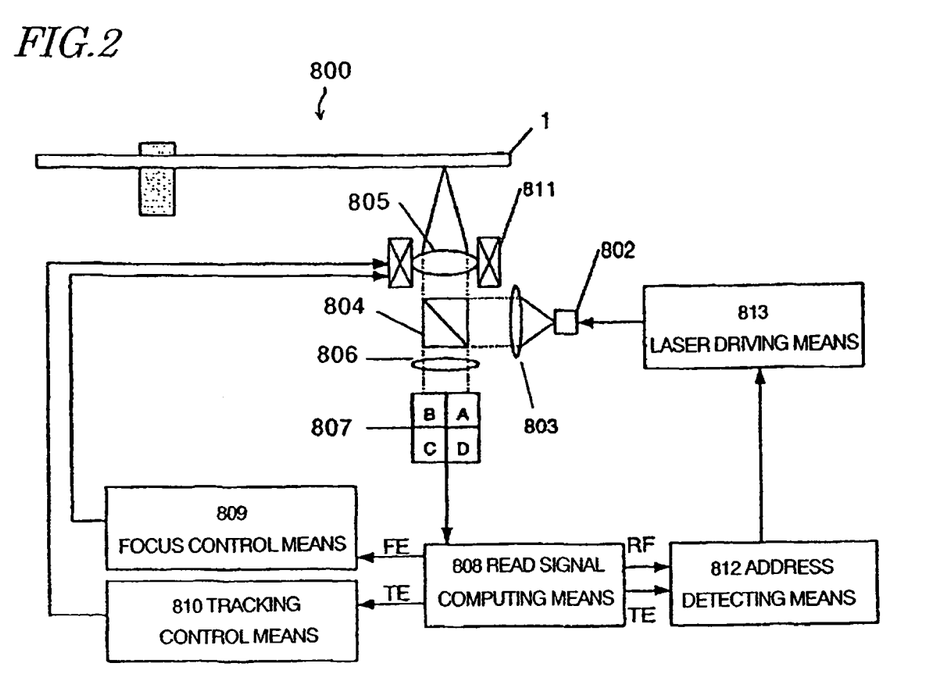
FIG. 2 is a schematic representation illustrating an optical disk drive for performing read and write operations on the optical disk of the first embodiment.

Next, an optical disk drive 800 that can write or read information on/from this optical disk 1 will be described with reference to FIG. 2.

The optical disk drive 800 includes a semiconductor laser diode 802 for emitting a laser beam. The laser beam, emitted from the semiconductor laser diode 802, passes through a collimator lens 803 and a beam splitter 804 and then is focused by an objective lens 805 onto the information recording layer of the optical disk 1.

In performing a write operation, the optical disk drive 800 changes the intensity of the light beam, thereby writing information on the recording layer of the optical disk. On the other hand, in performing a read operation, the optical disk drive 800 receives the light, which has been reflected and diffracted by the optical disk 1, at a photodetector 807 by way of the objective lens 805, beam splitter 804 and condenser lens 806, thereby generating read signals based on the light received. The photodetector 807 includes a plurality of light-receiving elements A, B, C and D, for example. In accordance with the quantities of light that have been detected by these light-receiving elements A, B, C and D, a read signal computing means 808 generates the read signals.

The read signal computing means 808 sends out a focus error (FE) signal and a tracking error (TE) signal to a focus control means 809 and a tracking control means 810, respectively. These control means 809 and 810 appropriately drive an actuator 811 for moving the objective lens 805 in response to the FE and TE signals, thereby irradiating a desired track location with a light spot of the focused light.

Also, this optical disk drive 800 reads out the information stored on the optical disk 1 by using the light spot that has been subjected to the focus and tracking controls. In accordance with RF and TE signals, which are among the output signals of the read signal computing means 808, an address detecting means 812 detects the address.

The following Table 1 shows various design parameters of the optical disk 1 of this embodiment, the wavelength of the laser beam for use to record information on this optical disk, and the numerical aperture of the objective lens for use to focus the laser beam onto the optical disk:

TABLE 1

| | |
|---|---|
| Laser wavelength | 405 nm |
| Numerical aperture of objective lens | 0.85 |
| Thickness of light transmitting layer | 0.1 mm |
| Diameter of disk | 120 mm |
| Data recording area | 24-58 mm in radius |
| Data efficiency | 83.7% |
| Recording method | Land/groove recording |
| Track pitch | 0.294 μm |
| Data bit length | 0.1213 μm |
| Channel bit length (T) | 0.0606 μm |
| Shortest mark length | 3 T (0.1819 μm) |
| Error correction code | RS (208, 192, 17) × RS (182, 172, 11) |

As shown in Table 1, the optical disk 1 of this embodiment is designed in such a manner that information is recorded by an optical disk drive that uses a laser beam with a relatively short wavelength of 405 nm and an objective lens with a relatively large numerical aperture of 0.85.

First, it will be described why the thickness of the disk base material to be the light transmitting layer is set equal to 0.1 mm. To reduce the size of the light spot in writing data of about 23 GB, this optical disk drive uses a laser beam with a wavelength of 405 nm and an objective lens with as high a numerical aperture as 0.85. However, if the numerical aperture of the objective lens is increased, then the resultant coma aberration also increases with respect to the tilt of the disk. The coma aberration is proportional to the third power of the numerical aperture of the objective lens. Accordingly, compared to a situation where a conventional objective lens with a numerical aperture of 0.6 is used, the coma aberration is about 2.8 times greater. To eliminate such an unwanted increase in coma aberration, the phenomenon that the coma aberration is proportional to the thickness of the base material may be utilized. In a DVD, the base material thickness is 0.6 mm. Accordingly, it can be seen that a base material with a thickness of 0.2 mm or less may be used. In this embodiment, a base material with a thickness of 0.1 mm is used. As a result, a greater tilt is allowed for the disk than the conventional DVD.

The diameter of the disk is set equal to 120 mm because the following advantage should be brought about. Specifically, since the CD and the DVD currently available both have a size of 120 mm, the user, who should be used to the handiness or the ease of use of the CD and the DVD, would accept a disk of the same size without feeling any inconvenience.

Next, it will be described why the data recording area is defined so as to extend from a radius of 24 mm to a radius of 58 mm. The inner boundary of the data recording area is defined by the inner radius of 24 mm. This is done to make the drive (i.e., the optical disk drive) designable easily by adopting the same design parameter as the conventional DVD. Also, if the light transmitting layer is formed by an injection molding process, for example, then the birefringence increases steeply around the disk outer periphery. When the birefringence is so much great, the amplitude of the read signal decreases and the data cannot be read accurately. For that reason, the outer boundary of the data recording area is defined by 58 mm, inside which the birefringence is relatively stabilized.

Next, it will be described why the land/groove recording technique is adopted. The land/groove recording technique is a method of recording a signal not only on groove tracks but also on land tracks between the groove tracks. To write data of about 23 GB on an optical disk having the above-specified sizes, a disk having a very narrow groove pitch should be made. In contrast, where the land/groove recording technique is adopted as is done in this embodiment, data is also written on the lands, and therefore, the groove pitch may be greater. Accordingly, there is no need to form grooves having a very narrow width and the disk can be easily manufactured advantageously.

Next, it will be described why the track pitch (i.e., the distance between the center of a groove and that of an adjacent land) is set equal to 0.294 μm. As described above, to write data of about 23 GB, this optical disk drive uses a laser beam with a wavelength of about 405 nm and an objective lens with a numerical aperture of about 0.85. In the conventional DVD-RAM on the other hand, a write operation is carried out under the conditions including a laser wavelength of 660 nm and a numerical aperture of 0.6. As for the conventional DVD-RAM, a track pitch of 0.615 μm was realized.

In this case, considering that the light spot diameter decreases proportionally to the laser wavelength and inversely proportionally to the numerical aperture of the objective lens, it can be seen that the optical disk 1 of this embodiment can have a track pitch of 0.266 μm.

In the land/groove recording, however, the effects of a "cross-erase" phenomenon that a signal corresponding to an adjacent track happens to be erased due to the thermal diffusion occurring during a write operation need to be taken into account. This is because there is just one physical level difference, contributing to the suppression of thermal diffusion, between a land portion and a groove portion. In recording information only on the grooves on the other hand, there are two physical level differences between two grooves, i.e., a level difference between one groove and a land and a level difference between the land and the other groove, and therefore, the thermal diffusion is suppressible relatively easily.

Considering that the light spot diameter may increase due to a variation of about 10 nm in laser wavelength and/or a variation of about 0.01 in numerical aperture, the track pitch required is 0.276 μm. Accordingly, by setting the track pitch equal to 0.28 μm or more, the resultant performance will be comparable to that of the conventional DVD-RAM even in view of possible variations of the optical system. It should be noted, however, that if the track pitch is greater than 0.32 μm, the desired storage capacity cannot be obtained unless the data bit length is defined to be very short. Nevertheless, such a short data bit length is inappropriate because the read signal should increase its jitter in that case. Thus, the track pitch is preferably 0.28 μm or more but 0.32 μm or less. For these reasons, the optical disk of this embodiment has a track pitch of 0.294 μm.

Next, it will be described why the data efficiency is set equal to 83.7%. The "data efficiency" (also called "format efficiency") is a ratio of the user data capacity (i.e., the data capacity that can be used by the user) to the total data capacity. In this embodiment, a data efficiency of as high as 80% or more is realized by adopting an appropriate data recording format. Hereinafter, this point will be described in further detail.

For the conventional DVD-RAM, a format, in which 370 bytes of ECC (error correction code) data and 279 bytes of address data, synchronization data and other types of data are added to every 2048 bytes of user data, has been adopted. In this case, the data efficiency is about 75.9%.

On the other hand, by adopting a format in which 279 bytes of address data, synchronization data and other types of data are added to every 16 user data/ECC data sets, each consisting of 2048 bytes of user data and 370 bytes of ECC data (i.e., to every 2418×16 bytes), the data efficiency can be increased to about 84%. In the DVD-RAM, the ECC data is calculated for every 16 user data sets (i.e., 2048×16). Accordingly, if the address data and synchronization data are provided for every 16 sets, these two groups of data can be well matched with each other.

Such a format in which the ratio of the address data to the user data is decreased from the conventional one as described above is described in Japanese Patent Application No. 2000-014494, which was filed by the applicant of the present application and which is hereby incorporated by reference. In that format, the address data (typically represented by pre-pits), which has been associated with each sector, is distributed in multiple sectors. In this manner, a redundant portion of the address data can be eliminated from each of those sectors and the ratio of the address data capacity to the total capacity of an optical disk can be decreased. In this embodiment, by using such a technique, a format, in which 370 bytes of ECC data, 4 bytes of address data, 26 bytes of synchronization data and other types of data are added to every 2048 bytes of user data, is adopted, thereby obtaining a data efficiency of 83.7%.

Also, where the address data is allocated dispersively to multiple sectors as described above, the pre-pits representing the address data may have mutually different lengths. Such a technique is described in Japanese Patent Application No. 2001-034914, which was filed by the applicant of the present application and which is hereby incorporated by reference.

In this manner, the data efficiency can be increased to 80% or more relatively easily. By increasing the data efficiency, a greater mark can be recorded. As a result, the read signal can have its amplitude increased and its quality improved.

Next, the data bit length will be described. The data bit length is determined with the track pitch, data efficiency, data recording area and required user data capacity taken into account. In the example shown in Table 1, a user data capacity of 25 GB is achievable by setting the data bit length equal to 0.1213 μm.

Next, it will be described why a modulation code of a 3T system (i.e., a modulation code in which the shortest mark length is three times as long as the channel bit length T) is adopted. Two types of modulation codes having shortest mark lengths of 2T and 3T, respectively, are known as being normally used for an optical disk or a magnetic disk. Examples of the former type that are used most frequently include a (1, 7, 2, 3) code (i.e., a so-called (1, 7) code). On the other hand, examples of the latter type include a (2, 10, 8, 16) code (i.e., a so-called "8-16 code") for a DVD, for example. Each of these two types of modulation codes has its own merits and demerits. Specifically, the (1, 7) code has a short channel byte length of 12 bits and ensures good conversion efficiency, but the shortest mark length thereof is as short as 2T. On the other hand, the 8-16 code has a shortest mark length of 3T, which is longer than that of the (1, 7) code, but the channel byte length thereof is 16 bits, thus resulting in bad conversion efficiency.

Figure 3:
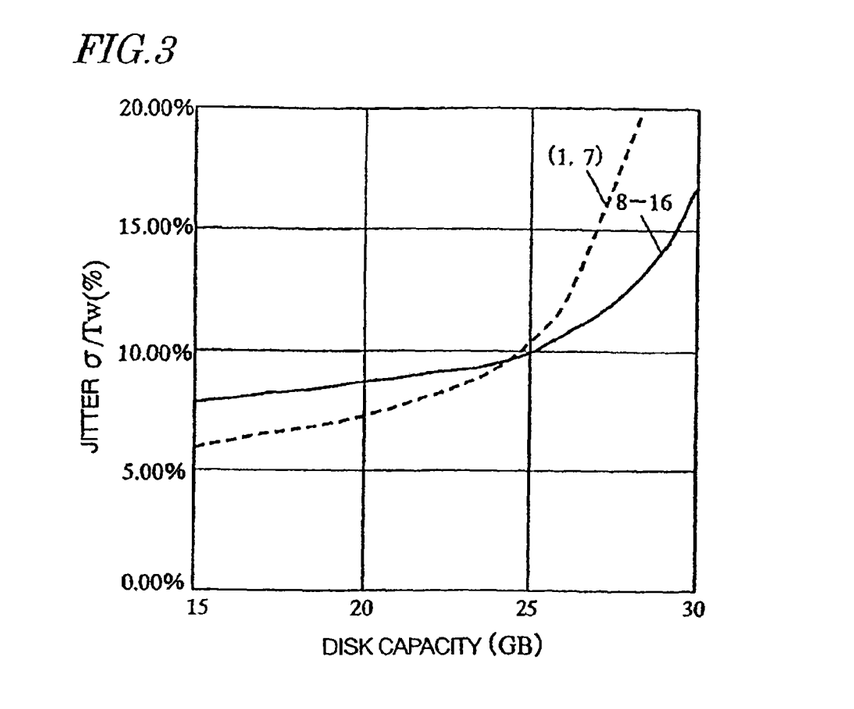
FIG. 3 is a graph showing the respective storage capacity versus jitter characteristics of a modulation code (1, 7) of a 2T system and a modulation code (8-16) of a 3T system.

The present inventors researched what difference is made by these two types of modulation codes in writing data of 25 GB or more. The results are shown in FIG. 3. FIG. 3 shows relationships between the recording density (i.e., disk capacity) and the jitter of the read signal. As shown in FIG. 3, in a range where the storage capacity is 24 GB or less, the (1, 7)

code (of the 2T system) results in the smaller jitter. This is believed to be because this code ensures high conversion efficiency (i.e., one channel window width thereof is broader than that of the 8-16 code). At densities of 24 GB or more, however, the relationship between these two codes turns over. That is to say, the jitter caused by the (1, 7) code worsens significantly. The reason is believed to be as follows. Since the shortest mark of the (1, 7) code is as short as 2T, the SNR of the mark declines extremely, thus affecting the signal jitter considerably. Accordingly, to reduce the jitter of the read signal, the 8-16 code of the 3T system is the more advantageous at capacities of 25 GB or more.

Figure 4:
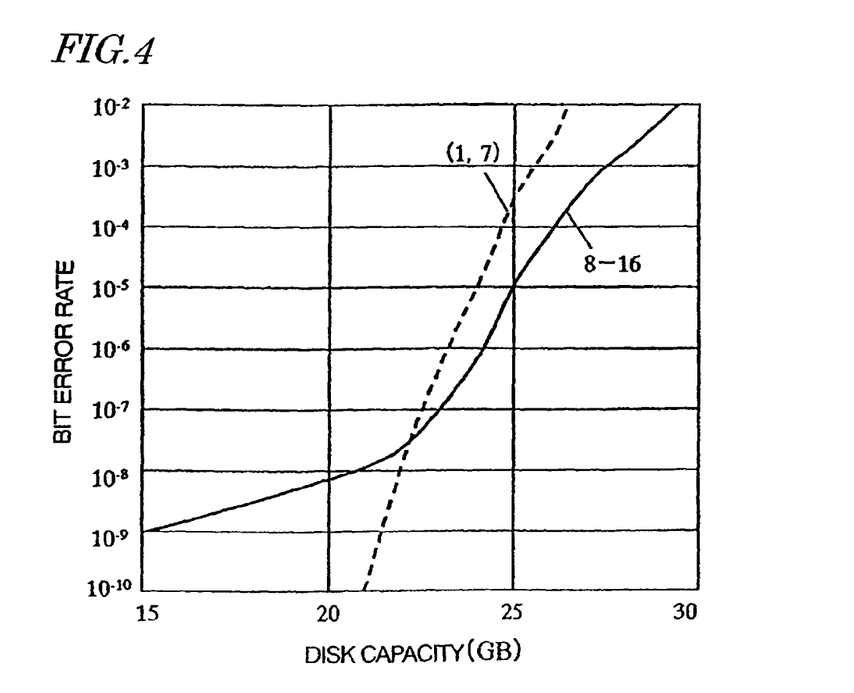
FIG. 4 is a graph showing the respective storage capacity versus error rate characteristics of a modulation code (1, 7) of a 2T system and a modulation code (8-16) of a 3T system.

FIG. 4 shows relationships between the recording density (i.e., disk capacity) and the bit error rate. As for this characteristic, the present inventors discovered that the relationship between the two types of codes turns over at around 22 GB and that the bit error rate of the 8-16 code is smaller than that of the (1, 7) code by more than one order of magnitude at densities of 25 GB or more.

Based on the results described above, the present inventors discovered that to realize a recording density of 25 GB or more, the modulation code of the 3T system is the more advantageous in terms of jitter and bit error rate. An 8-15 modulation code, ensuring higher efficiency by increasing the channel bit length to 15 bits, is a typical non-8-16 modulation code of the 3T system.

Next, it will be described why a so-called "product code (PC)", represented as RS (208, 192, 17)×RS (182, 172, 11), is used as the error correction code (ECC). Examples of error correction codes suitably applicable to an optical disk or a magnetic disk include not only the product code but also a long distance code (LDC) represented as (304)×RS (248, 216, 33). As in the modulation codes described above, the present inventors carried out a similar research to determine which of these two error correction codes is more qualified to write data of 25 GB. However, it is not an effective measure to take to rate the qualities of these error correction codes by the data capacity (recording density).

The reason is as follows. Specifically, as the capacity is increased, the errors occur more and more often as shown in FIG. 4. However, those errors are mostly random errors. The correction of those random errors is certainly one of the purposes for which error correction processing is carried out. But the point is how much ability to correct burst errors, generated by dust or dirt attached to the disk surface, the error correction processing has. Thus, the present inventors obtained, through computation, the relationships between the average burst length of the errors and the error correcting ability for these two types of error correction codes. The results are shown in FIG. 5.

Figure 5:
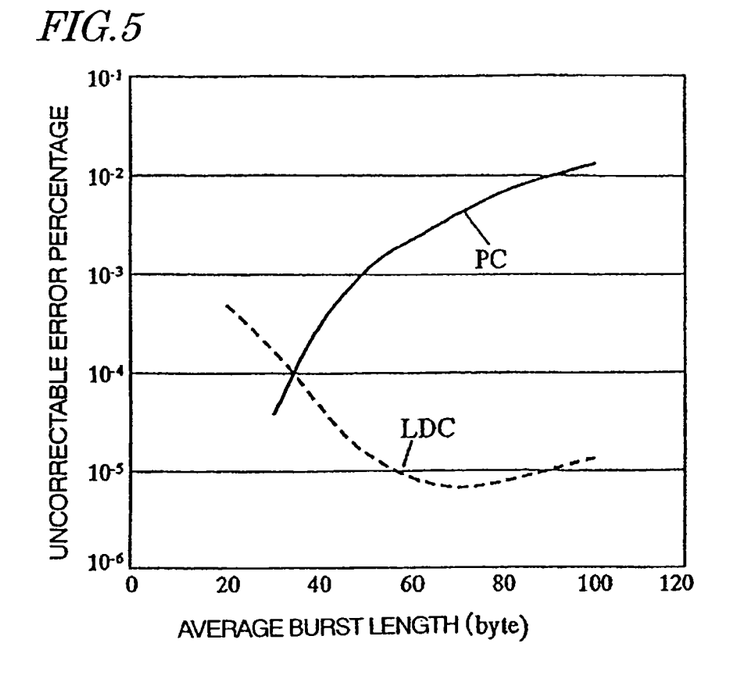
FIG. 5 is a graph showing, in comparison, the correcting abilities of a product code (PC) and a long distance code (LDC).

In FIG. 5, the abscissa represents the average burst error length. At any average burst error length, the total symbol error rate is supposed to be 2×10−2. The ordinate represents the percentage of uncorrectable errors, which is the percentage of errors remaining even after the error correction processing has been carried out. As can be clearly seen from FIG. 5, the relationship between the two types of error correction codes turns over at an average burst length of about 30-40 bytes. That is to say, if the burst length is longer than that value, the LDC results in the lower uncorrectable error percentage and realizes more appropriate correction. However, if the burst errors are short, then the PC shows higher correcting ability (i.e., lower uncorrectable error percentage) than the LDC. It should be noted that to obtain the results shown in FIG. 5 through computation, the PC is subjected in advance to a diagonal interleaving processing such as that shown in FIG. 6.

Figure 6:
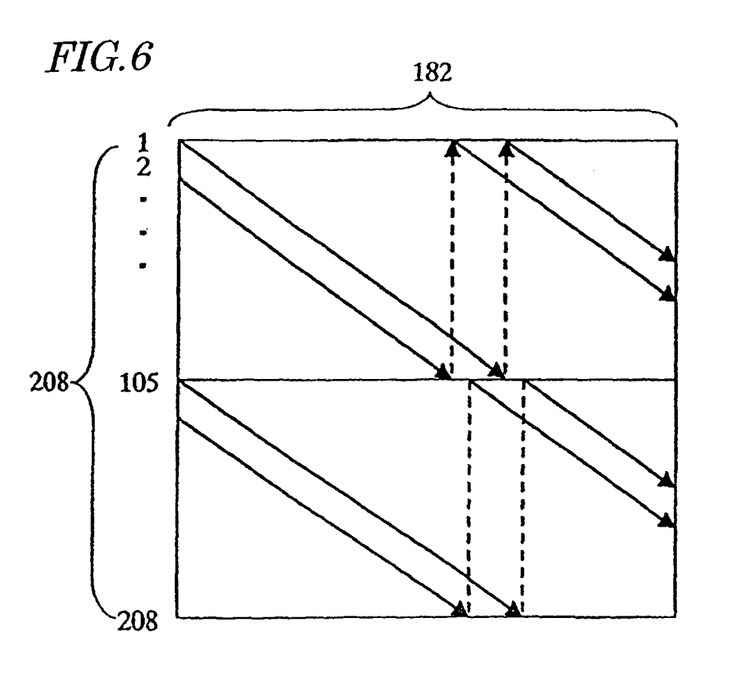
FIG. 6 is a diagram illustrating exemplary diagonal interleaving processing on a product code.

The "diagonal interleaving processing" herein refers to the following type of processing. First, two PCs stored on a memory are subjected to interleaving processing, thereby forming two PC groups. Next, each of these PC groups formed is read diagonally, e.g., a symbol at the 2nd row, 2nd column is read after a symbol at the 1st row, 1st column has been read. Thereafter, those symbols of the PCs are recorded on the disk in the order in which those symbols have been read. Then, the PC can exhibit correcting ability that has been strengthened against burst errors. It should be noted that such diagonal interleaving processing is described in Japanese Patent Application No. 2000-317452, for example, which was filed by the applicant of the present application and which is hereby incorporated by reference.

In this case, the question is exactly how big the dirt actually attached to an optical disk is. As for an optical disk packaged in a cartridge, it is expected that only dust or dirt that is small enough to pass through the gap of the cartridge can be attached to the disk. For example, the smoke particles of a cigarette have a diameter of at most about 10 μm. As described above, supposing one data bit length is equal to about 0.12 μm, one data byte length is eight time longer, i.e., about 1 μm. Accordingly, the cigarette smoke particle size of 10 μm may be regarded as corresponding to about 10 bytes. Thus, considering the burst errors caused by those fine particles that are small enough to enter the cartridge, it is expected that the product code should exhibit the higher correcting ability.

As described above, the optical disk according to the first embodiment of the present invention has a track pitch of 0.294 μm and a data bit length of 0.1213 μm, thus realizing a track density that is allowed a sufficient margin against the cross-erase phenomenon even in view of possible variations of the optical system. Also, by adopting a modulation code having the shortest mark length of 3T (e.g., 8-16 modulation code), the jitter can be kept smaller than a code of the 2T system (e.g., (1, 7) code) at recording densities of 24 GB or more. Furthermore, by using an error correction code represented as RS (208, 192, 17)×RS (182, 172, 11) (i.e., the product code), the short burst errors, caused by the dust that has been attached to the disk surface, can be corrected effectively. As a result, an optical disk having a practical capacity of 25 GB can be provided.

As for the embodiment described above, an optical disk including spiral grooves thereon has been described. Alternatively, the optical disk may include concentric grooves and lands thereon.

Embodiment 2

Figure 7A:
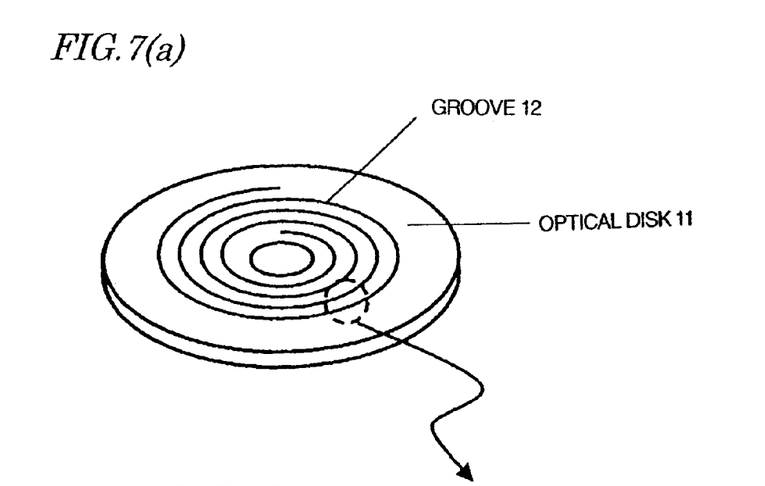
FIGS. 7(a) and 7(b) are respectively a perspective view and a partial view illustrating an optical disk according to a second embodiment.
Figure 7B:
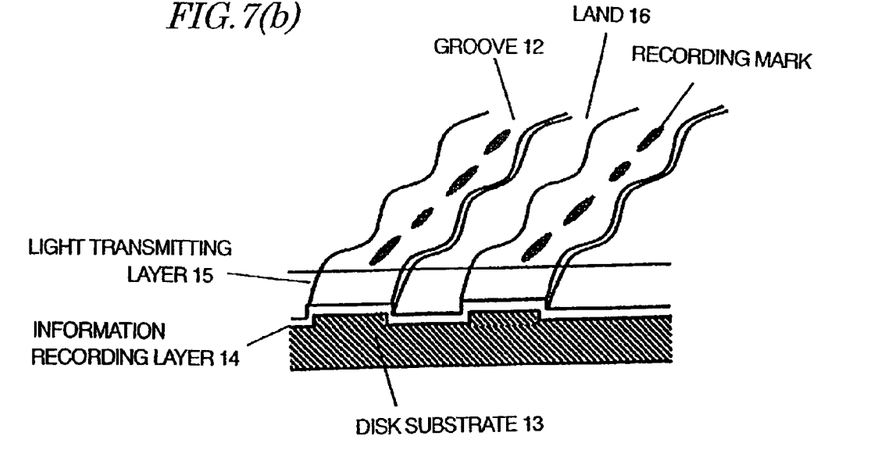

FIGS. 7(a) and 7(b) are respectively a perspective view and a partial view of an optical disk 11 according to a second embodiment of the present invention.

As shown in FIG. 7(a), spiral grooves 12 have been formed on the optical disk 11. This optical disk 11 has a diameter of 120 mm and has been formed to have a total thickness of 1.2 mm. Also, as shown in FIG. 7(b), the optical disk 11 is made by forming an information recording layer 14 of a GeSbTe film, for example, on a disk substrate 13. A light transmitting layer 15, which transmits a laser beam and guides it onto the information recording layer 14, is further formed on this information recording layer 14 so as to have a thickness of about 0.1 mm. A zone between two grooves 12 is also called a land 16. In the optical disk 11 of this embodiment, however, data is recorded either on the grooves 12 or on the lands 16.

The grooves are wobbled. The optical depth of the grooves is set approximately equal to λ/12, where λ is the laser wavelength. This is done to increase the amplitude of a signal and to obtain practical push-pull signal amplitude.

In recording data only on the grooves 12, the groove width is set greater than the land width. On the other hand, in recording data only on the lands, the land width is set greater than the groove width. In that case, the signal amplitude can be increased and the signal quality can be improved.

The following Table 2 shows various parameters of the optical disk 11 of this embodiment, the wavelength of the laser beam for use to record information on this optical disk, and the numerical aperture of the objective lens for use to focus the laser beam onto the optical disk:

TABLE 2

| | |
|---|---|
| Laser wavelength | 405 nm |
| Numerical aperture Of objective lens | 0.85 |
| Thickness of light transmitting layer | 0.1 mm |
| Diameter of disk | 120 mm |
| Data recording area | 24-58 mm in radius |
| Data efficiency | 84.6% |
| Recording method | Groove recording (or land recording) |
| Track pitch | 0.32 μm |
| Data bit length | 0.1155 μm |
| Channel bit length (T) | 0.0578 μm |
| Shortest mark length | 3 T (0.1733 μm) |
| Error correction code | RS (208, 192, 17) × RS (182, 172, 11) |

A base material with a thickness of 0.1 mm is used as the light transmitting layer because of the same reason as that described for the first embodiment. Also, the disk diameter is set equal to 120 mm and the data recording area is defined to extend from a radius of 24 mm to a radius of 58 mm for the same reasons as those already described for the first embodiment.

Next, it will be described why the groove recording is adopted. For example, if the groove recording technique is applied to an optical disk, which uses a phase change type material so that an amorphous portion is formed as a recording mark and from which a difference in reflectance between the crystalline and amorphous portions is read as a signal, then the film thereof may be designed in such a manner as to create a phase difference between the amorphous and crystalline portions and thereby obtain great amplitude. In the land/groove recording technique, however, the difference in depth between the lands and the grooves, i.e., the phase difference between them, is used to reduce the crosstalk. Accordingly, such a design as to create a phase difference between the amorphous and crystalline portions is not preferable for the land/groove recording technique because the crosstalk increases in that case. Thus, by adopting the groove recording technique, the signal amplitude designed can be great and the signal quality can be improved.

Next, it will be described why the track pitch is set equal to 0.320 μm. As in the first embodiment, a laser beam with a wavelength of about 405 nm and an objective lens with a numerical aperture of about 0.85 are also used in this embodiment to write data of about 23 GB. Accordingly, as already described for the first embodiment, the track pitch can be set equal to 0.266 μm for a write operation.

Figure 8:
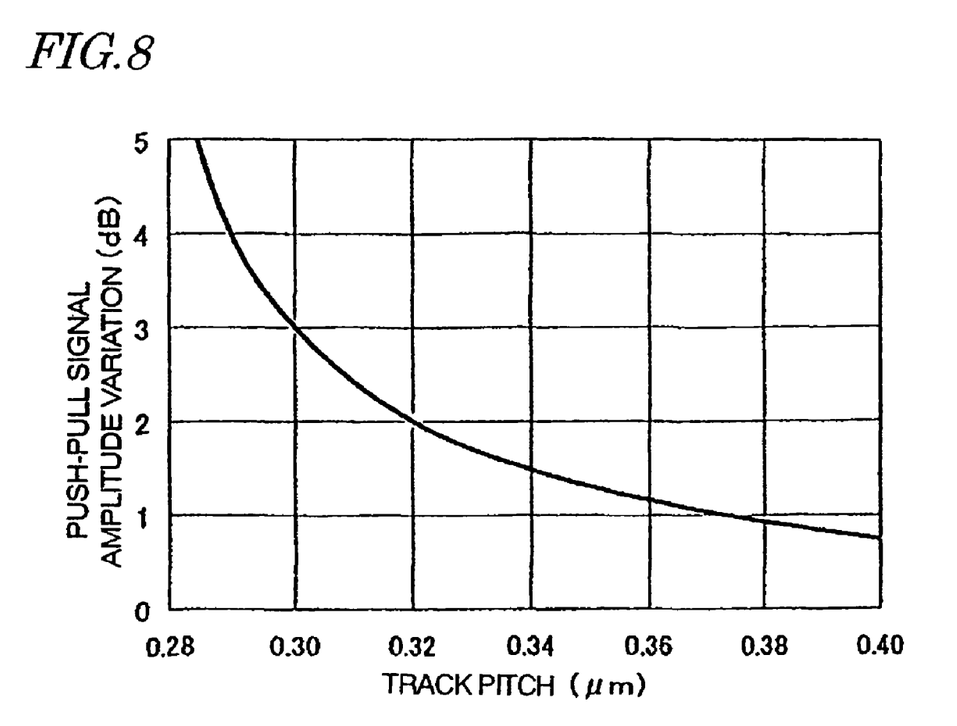
FIG. 8 is a graph illustrating a track pitch versus push-pull signal amplitude variation characteristic.

In the groove recording technique, however, if the track pitch (i.e., the distance between the center of a groove and that of an adjacent groove) is 0.266 μm, the amplitude of a push-pull signal is small. Accordingly, a non-negligible variation should occur in the amplitude of the push-pull signal if the track pitch is not constant. As a result, it becomes difficult to perform the tracking servo control.

FIG. 8 shows the results obtained by simulating the relationship between the track pitch and the variation in amplitude of a push-pull signal due to inconstant track pitches. The variation in track pitch was supposed to be ±15 nm, which is an adequate value that is actually realizable in a manufacturing process in view of the feeding precision of a cutting machine, for example. To realize a tracking servo system that works stably, the amplitude variation is preferably 2 dB or less. For that purpose, the track pitch is preferably 0.32 μm or more.

Next, it will be described why the data efficiency is defined as 84.6%. The conventional DVD-RAM has a format in which 370 bytes of ECC data and 279 bytes of address data, synchronization data and other types of data are added to every 2048 bytes of user data. Thus, the data efficiency thereof was 75.9%. If this data efficiency can be increased, then a greater mark can be recorded and the read signal can have its amplitude increased and its quality improved.

For example, by replacing the format of the conventional DVD-RAM with a format in which 279 bytes of address data, synchronization data and other types of data are added to every 16 user data/ECC data sets (i.e., to every 2418×16 bytes), the data efficiency can be increased to about 84%. In the DVD-RAM, the ECC data is calculated for every 16 user data sets (i.e., 2048×16). Accordingly, if the address data and synchronization data are provided for every 16 sets, these two groups of data can be well matched with each other. In this manner, the data efficiency can be increased to 80% or more relatively easily.

On the other hand, by adopting, as a format realizing higher data efficiency, a format in which 93 bytes of block marks and so on are added to every 32 user data/ECC data sets (i.e., to every 2418×32 bytes), a data efficiency of 84.6% is realized in this embodiment. In the DVD-RAM, the ECC data is calculated for every 16 user data sets (i.e., 2048×16). Accordingly, if the block marks and so on are provided for the double thereof, i.e., every 32 sets, these two groups of data can be well matched with each other.

It should be noted that to achieve that high data efficiency, address data is represented in this embodiment by changing the wobble patterns of the grooves. Thus, areas for address data can be eliminated. Then, the areas that were allocated to the address data can also be used as user data areas. As a result, the data efficiency can be increased. This technique is described in Japanese Patent Application No. 2000-319009, which was filed by the applicant of the present application and which is hereby incorporated by reference.

Hereinafter, an optical disk, in which the wobbling structure of the track grooves is defined by a combination of several types of displacement patterns, will be described in detail with reference to the accompanying drawings.

In this embodiment, the planar shape of the track grooves does not consist of just a sine waveform but at least part of it has a shape different from the sine waveform. A basic configuration for such a groove is disclosed in the descriptions of Japanese Patent Applications Nos. 2000-6593, 2000-187259 and 2000-319009, which were filed by the applicant of the present application and which are hereby incorporated by reference.

Figure 10A:
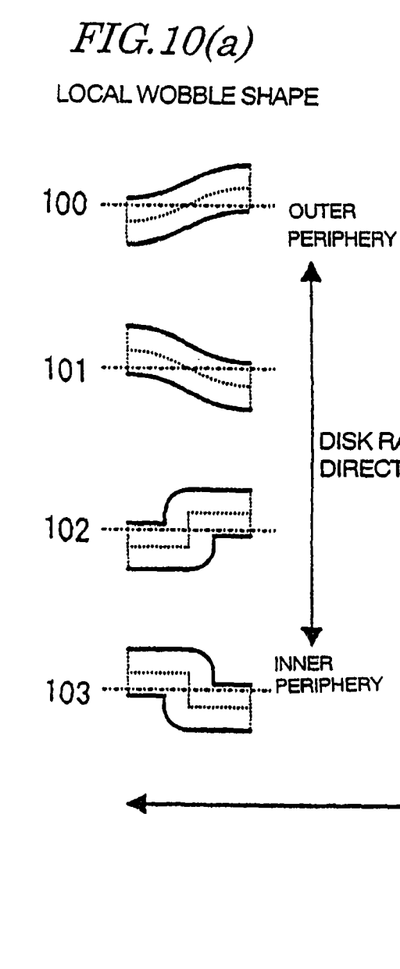
FIG. 10(a) illustrates the pattern primitives.
Figure 10B:
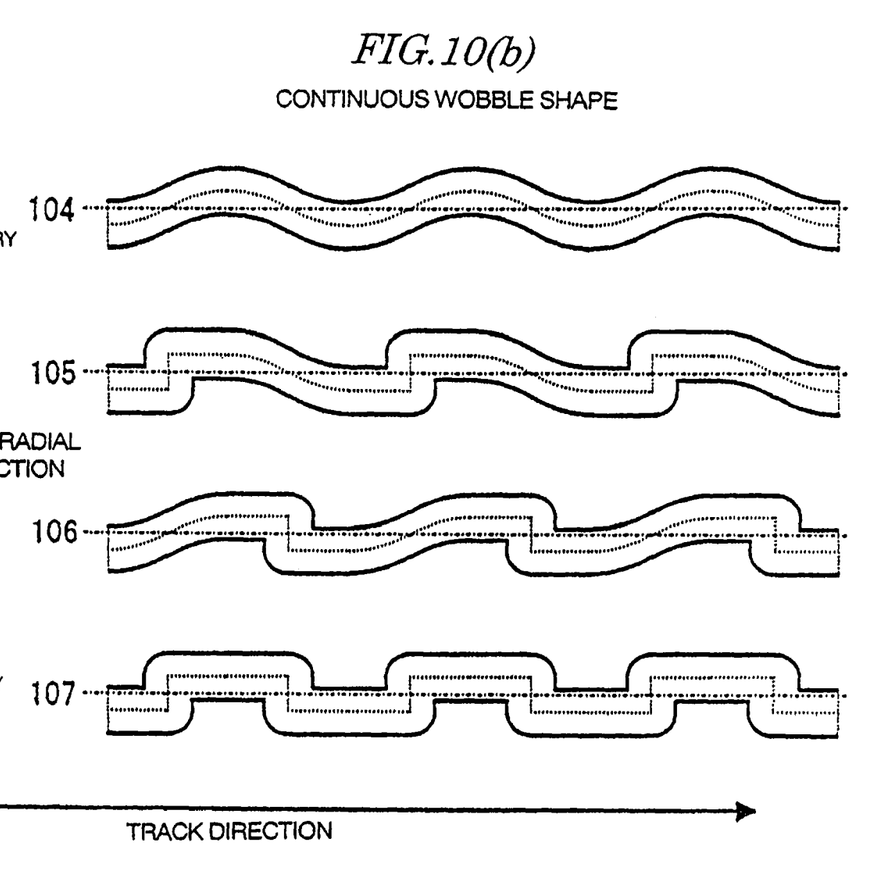
FIG. 10(b) illustrates specific wobble patterns.

FIG. 10(a) illustrates the four types of basic elements that make up a wobble pattern of the track grooves 2. In FIG. 10(a), smooth sine waveform portions 100 and 101, a portion 102 with a steep disk-outer-periphery-oriented displacement and a portion 103 with a steep disk-inner-periphery-oriented displacement are illustrated. By combining these elements or portions with each other, the four types of wobble patterns 104 through 107 shown in FIG. 10(b) are formed.

The wobble pattern 104 is a sine wave with no steeply displaced portions. This pattern will be herein referred to as a "fundamental waveform". It should also be noted that the "sine wave" is not herein limited to a perfect sine curve, but may broadly refer to any smooth wobble.

The wobble pattern 105 includes portions that are displaced toward the disk outer periphery more steeply than the sine waveform displacement. Such portions will be herein referred to as "outer-periphery-oriented displaced rectangular portions".

In an actual optical disk, it is difficult to realize the displacement of track grooves in the disk radial direction vertically to the track direction. Accordingly, an edge actually formed is not perfectly rectangular. Thus, in an actual optical disk, an edge of a rectangular portion may be displaced relatively steeply compared to a sine waveform portion and does not have to be perfectly rectangular. As can also be seen from FIG. 10(b), at a sine waveform portion, a displacement from the innermost periphery toward the outermost periphery is completed in a half wobble period. As for a rectangular portion, a similar displacement may be finished in a quarter or less of one wobble period, for example. Then, the difference between these shapes is sufficiently detectable.

The wobble pattern 106 is characterized by inner-periphery-oriented displaced rectangles while the wobble pattern 107 is characterized by both "inner-periphery-oriented displaced rectangles" and "outer-periphery-oriented displaced rectangles".

The wobble pattern 104 consists of the fundamental waveform alone. Accordingly, the frequency components thereof are defined by a "fundamental frequency (or wobble frequency)" that is proportional to the inverse number of the wobble period T. In contrast, the frequency components of the other wobble patterns 105 through 107 include not only the fundamental frequency components but also high-frequency components. Those high-frequency components are generated by the steep displacements at the rectangular portions of the wobble patterns.

In this embodiment, instead of writing address information on the grooves 2 by modulating the wobble frequency, the multiple types of wobble patterns are combined with each other, thereby recording various types of information, including the address information, on the track grooves. More specifically, by allocating one of the four types of wobble patterns 104 through 107 to each predetermined section of the track grooves, four types of codes (e.g., "B", "S", "0" and "1", where "B" denotes block information, "S" denotes synchronization information and a combination of zeros and ones represents address data, for example) may be recorded.

Next, the fundamentals of an inventive method for reading information, which has been recorded by the wobble of the track grooves, from the optical disk will be described with reference to FIGS. 11 and 12.

Figure 11:
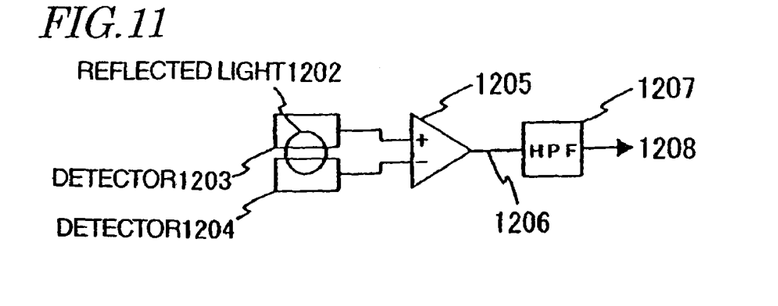
FIG. 11 illustrates a main part of an apparatus for use to read information from the disk of the second embodiment.

FIG. 11 illustrates a main portion of a reproducing apparatus. The track groove 1200 schematically illustrated in FIG. 12 is scanned by a read laser beam 1201 so that the spot thereof moves in the direction indicated by the arrow. The laser beam 1201 is reflected from the optical disk to form reflected light 1202, which is received by detectors 1203 and 1204 of the reproducing apparatus shown in FIG. 11. The detectors 1203 and 1204 are spaced apart from each other in a direction corresponding to the disk radial direction and each output a voltage corresponding to the intensity of the light received. If the position at which the detectors 1203 and 1204 are irradiated with the reflected light 1202 (i.e., the position at which the light is received) shifts toward one of the detectors 1203 and 1204 with respect to the centerline that separates the detectors 1203 and 1204 from each other, then a difference is created between the outputs of the detectors 1203 and 1204 (which is "differential push-pull detection"). The outputs of the detectors 1203 and 1204 are input to a differential circuit 1205, where a subtraction is carried out on them. As a result, a signal representing the wobble shape of the groove 1200 (i.e., a wobble signal 1206) is obtained. The wobble signal 1206 is input to, and differentiated by, a high-pass filter (HPF) 1207. Consequently, the smooth fundamental components that have been included in the wobble signal 1206 are attenuated and instead a pulse signal 1208, including pulse components corresponding to rectangular portions with steeps gradients, is obtained. As can be seen from FIG. 12, the polarity of each pulse in the pulse signal 1208 depends on the direction of its associated steep displacement of the groove 1200. Accordingly, the wobble pattern of the groove 1200 is identifiable by the pulse signal 1208.

Figure 12:
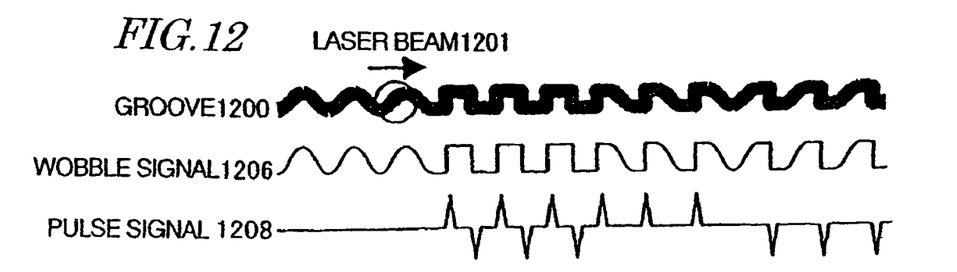
FIG. 12 illustrates a groove of the disk and a wobble signal and a pulse signal that have been generated therefrom.
Figure 13:
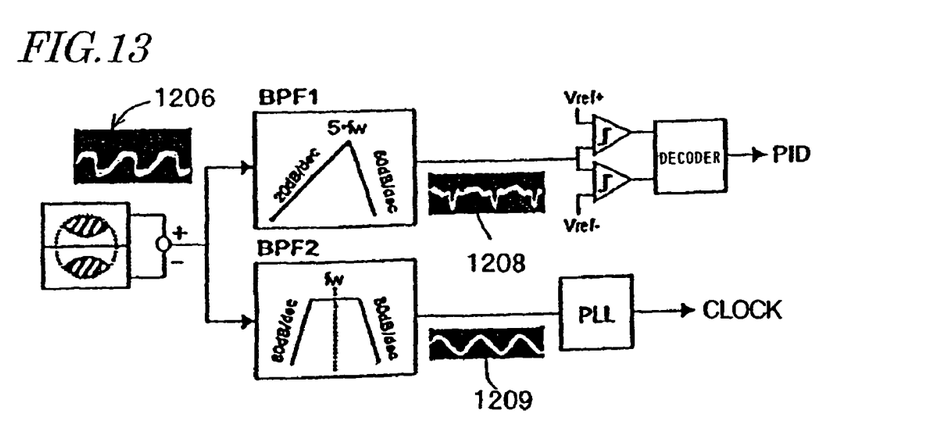
FIG. 13 illustrates an exemplary configuration for a circuit for generating the pulse signal and a clock signal from the wobble signal shown in FIG. 12.

Next, referring to FIG. 13, illustrated is an exemplary circuit configuration for generating the pulse signal 1208 and a clock signal 1209 from the wobble signal 1206 shown in FIG. 12.

In the exemplary configuration illustrated in FIG. 13, the wobble signal 1206 is input to first and second band-pass filters BPF1 and BPF2, which generate the pulse and clock signals 1208 and 1209, respectively.

Supposing the wobble frequency of the track is fw (Hz), the first band-pass filter BPF1 may be a filter having such a characteristic that the gain (i.e., transmittance) thereof reaches its peak at a frequency of 4 fw to 6 fw (e.g., 5 fw). In a filter like this, the gain thereof preferably increases at a rate of 20 dB/dec, for example, in a range from low frequencies to the peak frequency, and then preferably decreases steeply (e.g., at a rate of 60 dB/dec) in a frequency band exceeding the peak frequency. In this manner, the first band-pass filter BPF1 can appropriately generate the pulse signal 1208, representing the rectangularly changing portions of the track wobble, from the wobble signal 1206.

On the other hand, the second band-pass filter BPF2 has such a filtering characteristic that the gain thereof is high in a predetermined frequency band (e.g., in a band ranging from 0.5 fw to 1.5 fw and including the wobble frequency fw at the center) but is small at the other frequencies. The second band-pass filter BPF2 like this can generate a sine wave signal, having a frequency corresponding to the wobble frequency of the track, as the clock signal 209.

Next, the data bit length will be described. The data bit length is determined with the track pitch, data efficiency, data recording area and required user data capacity taken into account. In the example shown in Table 2, a user data capacity of 25 GB is achievable by setting the data bit length equal to 0.1155 µm.

It should be noted that the reason why a modulation code of the 3T system is used and the reason why a so-called product code (PC), represented as RS (208, 192, 17)×RS (182, 172, 11), is used as the error correction code are the same as those already described for the first embodiment.

As described above, the disk drive according to the second embodiment of the present invention adopts a track pitch of 0.32 µm and a data bit length of 0.1155 µm, thereby achieving the maximum track density within a range in which the tracking error signal is detectible. Also, by adopting a modulation code having the shortest mark length of 3T (e.g., 8-16 code), the jitter can be kept smaller than a code of the 2T system (e.g., (1, 7) code) at recording densities of 24 GB or more. Furthermore, by using an error correction code represented as RS ((208, 192, 17)×RS (182, 172, 11), the short burst errors, caused by the dust that has been attached to the disk surface, can be corrected effectively. As a result, an optical disk having a practical capacity of 25 GB can be provided.

As for the embodiment described above, an optical disk including spiral grooves thereon has been described. Alternatively, the optical disk may include concentric grooves and lands thereon.

Embodiment 3

Hereinafter, an optical disk according to a third embodiment will be described. This optical disk has the same configuration as the optical disk of the first embodiment shown in FIG. 1. However, unlike the first embodiment, modulation is carried out by using a modulation code of the 2T system.

The following Table 3 shows various parameters of the optical disk of this embodiment, the wavelength of the laser beam for use to record information on this optical disk, and the numerical aperture of the objective lens for use to focus the laser beam on the optical disk:

TABLE 3

| | |
|---|---|
| Laser wavelength | 405 nm |
| Numerical aperture of objective lens | 0.85 |
| Thickness of light transmitting layer | 0.1 mm |
| Diameter of disk | 120 mm |
| Data recording area | 24-58 mm in radius |
| Data efficiency | 83.7% |
| Recording method | Land/groove recording |
| Track pitch | 0.294 μm |
| Data bit length | 0.1213 μm |
| Channel bit length (T) | 0.0809 μm |
| Shortest mark length | 2 T (0.1617 μm) |
| Error correction code | RS (208, 192, 17) × RS (182, 172, 11) |

A base material with a thickness of 0.1 mm is used as the light transmitting layer because of the same reason as that described for the first embodiment. Also, the disk diameter is set equal to 120 mm, the data recording area is defined to extend from a radius of 24 mm to a radius of 58 mm and the land/groove recording technique is adopted for the same reasons as those already described for the first embodiment.

In this embodiment, however, a modulation code of the 2T system is used. The reason will be described below.

In using a modulation code of the 2T system, if the data bit length is the same, the channel bit length increases compared to the 3T system. Accordingly, the 2T system needs a lower channel clock frequency to achieve the same data transfer rate. Thus, when the transfer rate is high, it is more preferable to use a modulation code of the 2T system.

More specifically, supposing the data transfer rate is T (megabits per second) in the example shown in Table 3, the 2T system (e.g., (1, 7) modulation) needs a channel clock frequency of 1.5 T (MHz) while the 3T system (e.g., (8-16) modulation) needs a channel clock frequency of 2.0 T (MHz).

In using a modulation code of the 2T system, however, the shortest mark length is shorter than that of the 3T system, and a 2T mark has small signal amplitude, thus possibly deteriorating the jitter disadvantageously. In that case, a 2T mark is easily detected as a 1T mark erroneously. As a result, errors may occur.

Nevertheless, in decoding a signal by a PRML (partial response maximum likelihood) method, a most likely signal is estimated by performing pattern matching on the signal, and therefore, even a signal containing an error may be decoded correctly. In this case, even if a 2T mark has been detected as a 1T mark erroneously, the 2T mark can also be decoded correctly by the PRML decoding method.

Figure 9A:
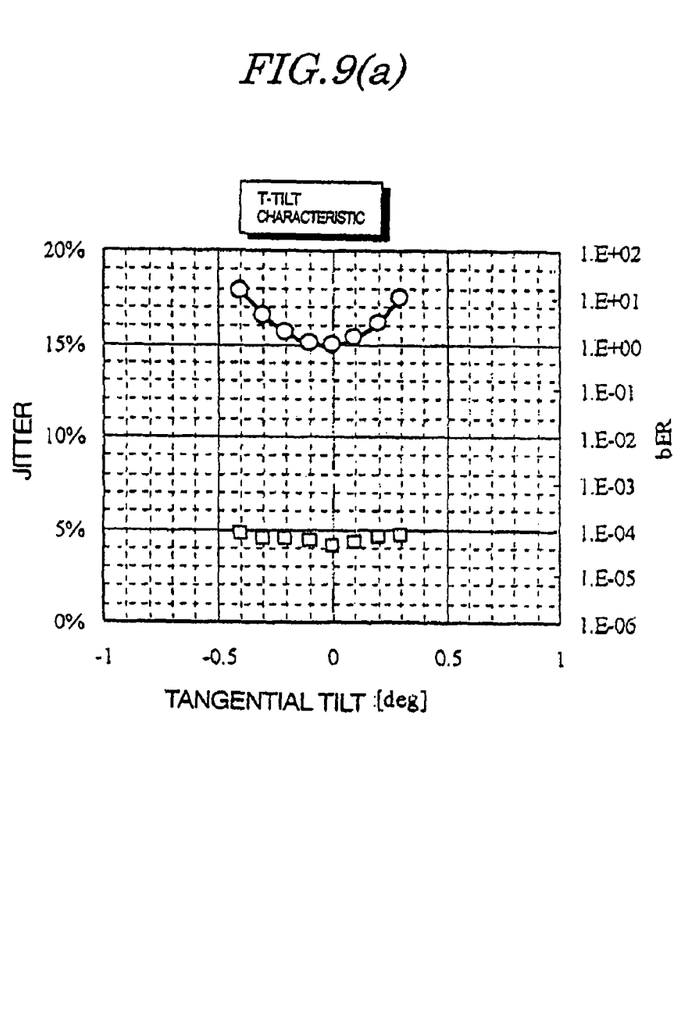
FIG. 9(a) is a graph associated with a tangential tilt.
Figure 9B:
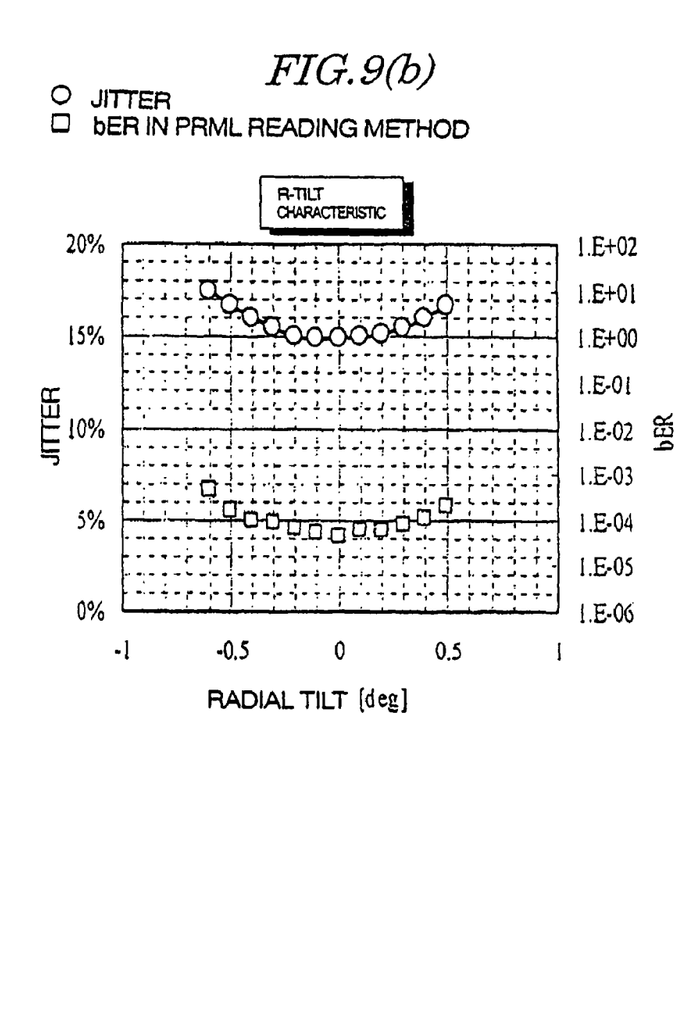
FIG. 9(b) is a graph associated with a radial tilt.

FIGS. 9(a) and 9(b) show how the jitter and the bit error rate of a read signal change with the tilt angle in the PRML reading method when the shortest mark length is 0.138 μm. In FIGS. 9(a) and 9(b), the abscissas represent a tilt angle in the tangential direction (i.e., a tangential tilt) and a tilt angle in the radial direction (i.e., a radial tilt), respectively.

As can be seen from these drawings, since the mark length is as short as 0.138 μm, the jitter is as high as 15%. However, even when the jitter is that high, the bit error rate after the mark has been decoded by the PRML reading method is 10×e−4, which is good enough.

Thus, in decoding a mark by the PRML method, even if a modulation code of the 2T system is used, the occurrence of errors is minimized and therefore no problems should be caused.

Also, as shown in FIG. 9, if a signal is read by the PRML reading method when a modulation code of the 2T system is used, high read signal quality is still ensured even though the shortest mark length is 0.138 μm. Accordingly, where the shortest mark length is set equal to 0.138 μm, a track pitch realizing a capacity of 25 GB may be increased to at least 0.344 μm.

Embodiment 4

Hereinafter, an optical disk according to a fourth embodiment will be described. This optical disk has the same configuration as the optical disk 11 of the second embodiment shown in FIG. 7. However, unlike the second embodiment, a modulation code of the 2T system is used.

The following Table 4 shows various parameters of the optical disk of this embodiment, the wavelength of the laser beam for use to record information on this optical disk, and the numerical aperture of the objective lens for use to focus the laser beam on the optical disk:

TABLE 4

| | |
|---|---|
| Laser wavelength | 405 nm |
| Numerical aperture of objective lens | 0.85 |
| Thickness of light transmitting layer | 0.1 mm |
| Diameter of disk | 120 mm |
| Data recording area | 24-58 mm in radius |
| Data efficiency | 84.6% |
| Recording method | Groove recording |
| Track pitch | 0.32 μm |
| Data bit length | 0.1155 μm |
| Channel bit length (T) | 0.077 μm |
| Shortest mark length | 2 T (0.154 μm) |
| Error correction code | RS (208, 192, 17) × RS (182, 172, 11) |

A base material with a thickness of 0.1 mm is used as the light transmitting layer because of the same reason as that described for the second embodiment. Also, the disk diameter is set equal to 120 mm, the data recording area is defined to extend from a radius of 24 mm to a radius of 58 mm and the groove recording technique is adopted for the same reasons as those already described for the second embodiment.

In this embodiment, however, a modulation code of the 2T system is used. Even so, by combining the 2T modulation code with the PRML reading method as described for the third embodiment, the error rate can be reduced. Also, since the channel clock frequency becomes relatively low, this modulation effectively contributes to achieving a high transfer rate.

In the optical disk of this embodiment, when the shortest mark length was set equal to 0.138 μm, the same results as those shown in FIGS. 9(a) and 9(b) were also obtained. Accordingly, where the shortest mark length is set equal to 0.138 μm, a track pitch realizing a capacity of 25 GB may be increased to at least 0.357 μm.

INDUSTRIAL APPLICABILITY

The present invention provides an optical disk having high storage capacity by increasing the recording density greatly. For example, an optical disk having a diameter of 120 mm and a storage capacity of 23 GB or more, for example, is realized by the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical disk comprising a groove and a land and on which data is recorded only on the land,
   wherein the disk is configured to receive a light beam having a wavelength of 405 nm and which light beam has been converged by a lens having a numerical aperture of 0.85 for writing the data to the disc and reading the data from the disk;
   wherein a pitch of the groove and a pitch of the land are 0.32 μm or more,
   wherein the optical disk has a data efficiency of 80% or more by adopting a format in which a portion of data other than user data is added to plural user data sets,
   the data efficiency being defined by a ratio of a user data capacity to a total data capacity of the optical disk.

2. The optical disk of claim 1, further comprising a light transmitting layer on the surface of the disk on which the groove and the land have been formed, the light transmitting layer having a thickness of 0.2 mm or less.

3. The optical disk of claim 1, wherein a distance between the center of the land and the center of the groove adjacent to the land is 0.28 μm or more, and wherein the groove comprises a plurality of wobble patterns representing address information.

4. The optical disk of claim 1, wherein the optical disk has a storage capacity of 23 GB or more.

5. The optical disk of claim 1, wherein the optical disk further comprises a recording layer of a phase change material and the data is rewritable.

6. An apparatus for writing information on an optical disk, the apparatus comprising:
   a light source with a wavelength of 405 nm; and
   an objective lens with a numerical aperture of 0.85 for converging a laser beam, which has been emitted from the light source, on the optical disk,
   wherein the apparatus writes information on one or the other of a land or a groove of the optical disk by changing the intensities of the laser beam emitted from the light source,
   wherein a pitch of the groove and a pitch of the land are 0.32 μm or more,
   wherein the optical disk has a data efficiency of 80% or more by adopting a format in which a portion of data other than user data is added to a plurality of user data sets,
   the data efficiency being defined by a ratio of a user data capacity to a total data capacity of the optical disk.

7. The apparatus of claim 6, wherein when the user data is written on either a land or a groove of the optical disk, a portion of data other than the user data is added to every a predetermined number of user data sets.

8. An apparatus for reading information from the an optical disk, the apparatus comprising:
   a light source with a wavelength of 405 nm;
   an objective lens with a numerical aperture of 0.85 for converging a laser beam, which has been emitted from the light source, on the optical disk; and
   a photodetector for receiving light that has been reflected from the optical disk, wherein a read signal is generated based on the light received at the photodetector, thereby reading information that is stored in either a land or a groove of the optical disk, wherein said optical disk comprises a groove and a land and on which data is recorded on one or the other of the land or the groove,
   wherein a pitch of the groove and a pitch of the land are 0.32 μm or more,
   wherein the optical disk has a data efficiency of 80% or more by adopting a format in which a portion of data other than user data is added to plural user data sets,
   the data efficiency being defined by a ratio of a user data capacity to a total data capacity of the optical disk.

9. An optical disk comprising a groove and a land and on which data is recorded only on the groove,
   wherein the disk is configured to receive a light beam having a wavelength of 405 nm and which light beam has been converged by a lens having a numerical aperture of 0.85 for writing the data to the disc and reading the data from the disk;
   wherein a pitch of the groove and a pitch of the land are 0.32 μm or more,
   wherein the optical disk has a data efficiency of 80% or more by adopting a format in which a portion of data other than user data is added to plural user data sets,
   the data efficiency being defined by a ratio of a user data capacity to a total data capacity of the optical disk.

10. The optical disk of claim 9 further comprising a light transmitting layer on the surface of the disk on which the groove and the land have been formed, the light transmitting layer having a thickness of 0.2 mm or less.

11. The optical disk of claim 9, wherein a distance between the center of the land and the center of the groove adjacent to the land is 0.28 μm or more, and wherein the groove comprises a plurality of wobble patterns representing address information.

12. The optical disk of claim 9, wherein the optical disk has a storage capacity of 23 GB or more.

13. The optical disk of claim 9, wherein the optical disk further comprises a recording layer of a phase change material and the data is rewritable.

* * * * *